United States Patent [19]

Nelson

[11] Patent Number: 4,463,054
[45] Date of Patent: * Jul. 31, 1984

[54] PLASTIC-METAL LAMINATE, PROCESS, AND COMPOSITION

[75] Inventor: Wayne F. Nelson, Akron, Ohio

[73] Assignee: A. Schulman, Inc., Akron, Ohio

[*] Notice: The portion of the term of this patent subsequent to Feb. 1, 2000 has been disclaimed.

[21] Appl. No.: 419,129

[22] Filed: Sep. 17, 1982

[51] Int. Cl.$^3$ .................. B32B 15/08; B05D 3/02
[52] U.S. Cl. ........................... 428/458; 204/147; 427/318; 428/411.1; 428/461
[58] Field of Search ............ 428/327, 407, 408, 929, 428/458, 461; 204/147, 196; 524/496, 495; 252/502, 510, 511; 427/318, 122

[56] References Cited

U.S. PATENT DOCUMENTS

| | | | |
|---|---|---|---|
| 3,865,699 | 2/1975 | Luch | 252/510 |
| 3,868,313 | 2/1975 | Gay | 204/147 |
| 4,009,093 | 2/1977 | Luch | 252/510 |
| 4,288,353 | 9/1981 | Eckel et al. | 428/408 |
| 4,351,745 | 9/1982 | Stinger | 252/502 |
| 4,371,583 | 2/1983 | Nelson | 428/358 |
| 4,407,893 | 10/1983 | Malizio | 427/318 |
| 4,421,678 | 12/1983 | Mehta | 252/511 |

OTHER PUBLICATIONS

"Carbon Blacks for Conductive Plastics", Cabot Corporation; Boston, Mass. 02110.

Primary Examiner—George F. Lesmes
Assistant Examiner—William M. Atkinson
Attorney, Agent, or Firm—Gordon W. Hueschen

[57] ABSTRACT

Resistance to cathodic or galvanic disbondment of plastic-metal laminates is obtained by incorporating in the metal bonding plastic material used in forming the laminate an amount of conductive carbon black effective to minimize or prevent disruption of the bond by galvanic action which otherwise would take place in the absence of the conductive carbon black. The conductive carbon black is used in a relatively high concentration, for example, between about 20 and about 40 percent, with the balance of the composition being made up of a polymeric material containing an amount effective to promote bonding between the metal and the polymeric material of an ionomeric copolymer containing about 25 to about 98.5 percent ethylenic units and between about 1.5 to about 30 percent carboxylic acid units, the major proportion of which is in the free acid form. Advantageously, two-thirds or more of the carboxylic units are in the free form and the remainder, if any, are neutralized by zinc.

18 Claims, No Drawings

PLASTIC-METAL LAMINATE, PROCESS, AND COMPOSITION

BACKGROUND OF THE INVENTION

1. Field of the Invention

The invention relates to a plastic-metal laminate resistant to galvanic disbonding, to a process for preparing the same and to plastic materials suitable for use therein.

2. Prior Art

Innumerable thermoplastics have previously been proposed for making plastic-metal laminates suitable for use in the automotive industry and otherwise, but with less than the desired degree of success in regard to the permanency of the bond when the laminate is exposed to galvanic action due to exposure to salt solutions. For example, when a plastic-metal laminate is affixed to an automobile body by a sheet metal screw and exposed to salt solutions, as when the roads are treated with calcium chloride during the winter, a galvanic couple is set up which results in the formation of hydrogen between the plastic material and the metal to which it is laminated, thus causing disruption of the bond.

Notwithstanding that continued research has been directed to this problem, no really satisfactory solution therefor has been found. There is a need, therefore, in the art of plastic-metal laminates which are not subject to the failures and shortcomings of the prior art and which accordingly are particularly well adapted and suitable for use in the automotive area.

OBJECTS OF THE INVENTION

It is an object of the invention to provide novel plastic-metal laminates, a novel process for preparing the same and novel plastic materials suitable for use therein. It is another object of the invention to provide such plastic-metal laminates which are resistant to galvanic disbonding. A further object of the invention is to provide novel such laminates in which the metal bonding plastic material used therein contains an amount of conductive carbon black effective to minimize or prevent disruption of the bond by galvanic action which otherwise would occur in the absence of the conductive carbon black. Still further objects of the invention are to avoid the disadvantages of the prior art and to obtain such advantages as will appear as the description proceeds.

SUMMARY OF THE INVENTION

The invention is directed to a plastic-metal laminate resistant to galvanic disbonding comprising a layer of metal bonding plastic material bonded to metal, said plastic material containing an amount of conductive carbon black effective to minimize or prevent disruption of the bond by galvanic action which otherwise would take place in the absence of the conductive carbon black and is particularly directed to such a laminate in which said metal bonding plastic material comprises from about 60 to about 80 percent of a polymeric material containing an amount effective to promote bonding between said metal and said polymeric material of an ionomeric copolymer containing between about 25 to about 98.5 percent ethylenic units and between about 1.5 to about 30 percent carboxylic acid units, at least the major proportion of which is in the free acid form, and the balance conductive carbon black.

It is also directed to a metal bonding plastic material containing an amount of conductive carbon black effective to minimize or prevent disruption of a bond between the plastic material and the metal due to galvanic action which otherwise would take place in the absence of the carbon black and is particularly directed to such a metal bonding plastic material comprising from about 60 to about 80 percent of a polymeric material containing an amount effective to promote bonding between said metal and said polymeric material of an ionomeric copolymer containing between about 25 to about 98.5 percent ethylenic units and between about 1.5 to about 30 percent carboxylic acid units, at least the major proportion of which is in the free acid form, and the balance conductive carbon black.

The invention also comprises one or more further features in which said polymeric material contains a compatible thermoplastic elastomer, in which the compatible thermoplastic elastomer is an ethylene-propylene elastomer, in which said compatible thermoplastic elastomer is a polyether polyester thermoplastic elastomer, advantageously a butylene poly(alkylylene ether) terephthalate, advantageously in which said polymeric material contains about 45 percent of said ionomeric copolymer, about 25 percent of said terephthalate, and about 30 percent of said conductive carbon black, in which said metal bonding plastic material contains about 60 to about 80 percent of ionomeric copolymer and said conductive carbon black to a total of about 100 percent, advantageously in which said polymeric material contains about 70 percent of said ionomeric copolymer, about 30 percent of said conductive carbon black and in which about two-thirds of the carboxylic acid groups are in the free acid form.

The invention also comprises a process for making such plastic laminates which comprises bonding a layer of metal bonding plastic material to metal, said plastic material containing an amount of conductive carbon black effective to minimize or prevent disruption of the bond by galvanic action which otherwise would take place in the absence of the conductive carbon black, cleaning the metal, heating the metal, and flowing said plastic material onto the cleaned, heated surface of such metal, which may contain one or more additional features in which the metal is cleaned by washing with detergent followed by a rinse with pure or de-ionized water and dried just before the bonding, in which said metal and plastic material are maintained at compatible temperatures during the bonding, in which the metal and the plastic material are maintained at a temperature between about 400 and about 430 degrees F., and in which the metal is passed through a crosshead die of an extruder designed to apply a coating of the plastic material thereon and in which said plastic material is concomitantly extruded at a rate to give a continuously smooth coating on said metal.

The parts and percentages given herein are by weight unless otherwise specified.

Suitable ionic or ionomeric copolymers are prepared by copolymerizing an alpha-olefin and an alpha, betaethylenically unsaturated carboxylic acid and are available on the market from E. I. DuPont de Nemours under the trademark Surlyn. The composition of these polymers can vary widely, as disclosed in U.S. Pat. Nos. 3,845,163 and 4,010,222, from between about 25 and 98.5 percent ethylene units and about 1.5 to about 30 percent carboxylic acid containing units.

Ordinarily, the olefin units are derived from ethylene and the carboxylic acid containing units from methacrylic acid. Generally speaking, it is of advantage for the purposes of this invention to have from about 8 to about 18 percent by weight of carboxylic acid containing units in the ionomer and to have the major portion of the carboxylic acid groups in the free acid form. Advantageously, from about 10 to about 35 percent of the carboxylic acid groups can be neutralized with metallic ions, especially zinc, which appears to improve adhesiveness to the metal. Copolymers of this type are also described, among other places, in U.S. Pat. Nos. 2,599,123 and 3,264,272 and Belgium Pat. No. 818,609. The polymers can be made by copolymerization or by graft polymerization, as set forth in U.S. Pat. No. 4,010,222.

The ionomeric copolymers used in the invention are well known in the art and their composition and manufacture do not constitute any part of the invention, except as the proportions may or may not effect the metal bonding character thereof or other properties making them suitable for lamination with metals.

Suitable such products include Surlyns TM, M1650, M1652, and M1705, as well as some of the copolymers listed in Table II of U.S. Pat. No. 4,010,222, particularly copolymers C and D.

The ionomeric copolymers above described can be blended or alloyed with other polymeric materials or additives commonly used in this art, such as ultraviolet stabilizers, antioxidants, and the like.

Suitable such modifying polymers include compatible thermoplastic elastomers, such as the ethylene-propylene elastomers disclosed in U.S. Pat. Nos. 3,658,752, 3,758,643, and 4,078,020. Suitable such ethylene elastomers are obtained by copolymerizing ethylene and propylene in the proportions of 60-85 percent ethylene and 15-40 percent propylene, advantageously 65-82 percent ethylene and 18-35 percent propylene, with or without the inclusion of a minor amount, up to about 5 percent, of a non-conjugated diene such as 1,4-hexadiene, norbornene, alkylidene norbornene, alkenyl norbornene, and dicyclopentadiene.

Other suitable thermoplastic elastomers are polyether polyester thermoplastic elastomers, such as those disclosed in U.S. Pat. No. 4,010,222. One particularly suitable material is a butylene poly(alkylene ether) terephthalate, marked under the trademark Hytrel TM 4056 by E. I. DuPont deNemours and Company.

Conductive carbon black is a form of carbon black which is conductive of electricity. Such materials are well known and a suitable one is marketed under the trademark Conductex TM 975. The conductive carbon black imparts sufficient electrical conductivity to the plastic material bonded to the metal to maintain zero or substantially zero potential between the metal and the plastic at the bond and thus eliminates or minimizes cathodic or galvanic disbondment of the plastic from the metal. The conductive carbon black has the further advantage over ordinary carbon black in that it can be used in relatively high concentrations without affecting the ability of the metal bonding plastic material to bond with metals. Thus, when non-conductive carbon blacks are incorporated in metal bonding plastic materials, in concentrations in which conductive carbon black is effective to prevent galvanic disbonding, resistance to cathodic bonding is not obtained while, at the same time, poor adhesion to metal results.

DESCRIPTION OF THE PREFERRED EMBODIMENTS

The invention may be more fully understood by referring to the following detailed description.

EXAMPLE 1

Part A

A composition of 70 parts ionomeric copolymer of ethylene and methacrylic acid marketed under the trademark Surlyn TM 1705; 30 parts conductive carbon black, marketed under the trademark Conductex TM 975; and 0.1 part of a stabilizer, marketed under the trademark Irganox TM 1010 was blended according to standard mixing procedure, and thereafter pelletized or cubed.

Part B

A stainless steel formed strip having inturned edges was cleaned in a non-foaming detergent aqueous solution, rinsed with pure or de-ionized water, dried, heated to 400° to 430° F., and passed into a crosshead die of a Nelmor TM extruder. Concomitantly, therewith, the composition of Example 1 at a temperature of 400°-430° F. was extruded into the crosshead die and onto the heated stainless steel strip passing therethrough at a rate to provide a coating of 0.016 inch thick. The crosshead die was shaped to apply the polymer blend to the outer surface of the stainless steel strip, including the inturned edges, but not on the inner surface thereof. The resulting strip laminate had good adhesion and excellent water-test values as determined by standard automotive test procedures.

When the strip thus obtained was grounded to the body of an automobile, or the like, having a negative ground, by means of a metal screw and the assembly exposed to a 5 percent salt solution for three days at 60 degrees C, good adhesion with no tendency for galvanic disbondment was observed. These conditions were such that disbondment resulted in material containing ordinary carbon black, even at concentrations below 10 percent.

EXAMPLE 2

Part A

A composition of 45 parts of high free acid content ionomeric copolymer, marketed under the trademark Surlyn TM 1705; 25 parts of butylene poly(alkylene ether) terephthalate, marketed under the trademark Hytrel TM 4056; and 30 parts of conducting type carbon black, marketed under the trademark Conductex TM 975 was prepared according to standard mixing procedure, and thereafer pelletized or cubed.

Part B

A stainless steel formed strip having inturned edges was cleaned in a non-forming detergent aqueous solution, rinsed with pure or de-ionized water, dried, heated to 400° to 430° F., and passed into a crosshead die of a Nelmor TM extruder. Concomitantly, therewith, the composition of Example 2, PART A at a temperature of 400°-430° F. was extruded into the crosshead die and onto the heated stainless steel strip passing therethrough at a rate to provide a coating of 0.016 inch thick. The crosshead die was shaped to apply the polymer blend to the outer surface of the stainless steel strip, including the inturned edges, but not on the inner surface thereof.

The resulting strip laminate had good adhesion and excellent water-test values as determined by standard automotive test procedures.

When subjected to exposure to a 5 percent salt solution under the conditions described above, this laminate was even more resistant to cathodic or galvanic disbondment than the laminate of Example 2, Part B. Furthermore, because of the inclusion of the thermoplastic elastomer, a very dull extrusion surface resulted.

The composition of Examples 1 and 2 gave laminates with excellent surface hardness and excellent resistance to scuffing.

In both Examples 1 and 2, two-thirds of the carboxylic groups were free acid groups and the other one-third were neutralized with zinc.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:

1. A plastic-metal laminate resistant to galvanic disbonding comprising a layer of metal bonding plastic material bonded to one side of a metal strip, in which said metal bonding plastic material comprises from about 60 to about 80 percent of a polymeric material and a balance of about 20 to about 40 percent of conductive carbon black, said polymeric material being selected from the group consisting of
    (a) an ionomeric copolymer containing between about 25 to about 98.5 percent ethylenic units and between about 1.5 to about 30 percent carboxylic units, at least the major portion of which is in the free acid form, and
    (b) a blend of said ionomeric copolymer and a compatible thermoplastic elastomer, said ionomeric copolymer being present in an amount effective to promote bonding between said metal and said metal bonding plastic material.

2. A plastic-metal laminate of claim 1, in which said polymeric material contains a compatible thermoplastic elastomer.

3. A plastic-metal laminate of claim 2, in which said compatible thermoplastic elastomer is an ethylene-propylene elastomer.

4. A plastic-metal laminate of claim 3, in which about two-thirds of the carboxylic acid groups are in the free acid form.

5. A plastic-metal laminate of claim 2, in which said compatible thermoplastic elastomer is a polyether polyester thermoplastic elastomer.

6. A plastic-metal laminate of claim 4, in which said thermoplastic elastomer is a butylene poly(alklylene ether) terephthalate.

7. A plastic-metal laminate of claim 6, in which about two-thirds of the carboxylic acid groups are in the free acid form.

8. A plastic-metal laminate of claim 6 in which said metal bonding plastic material contains about 45 percent of said ionomeric copolymer, about 25 percent of said terephthalate, and a balance of about 30 percent of said conductive carbon black.

9. A plastic-metal laminate of claim 8, in which about two-thirds of the carboxylic acid groups are in the free acid form.

10. A plastic-metal laminate of claim 1, in which said metal bonding plastic material contains about 60 to about 80 percent of ionomeric copolymer.

11. A plastic-metal laminate of claim 10, in which said metal bonding plastic material contains about 70 percent of said ionomeric copolymer, and a balance of about 30 percent of said conductive carbon black.

12. A plastic-metal laminate of claim 11, in which about two-thirds of the carboxylic acid groups are in the free acid form.

13. A plastic-metal laminate of claim 1, in which about two-thirds of the carboxylic acid groups are in the free acid form.

14. A process for preparing a plastic-metal laminate resistant to galvanic disbonding comprising a layer of metal bonding plastic material to one side of a metal strip, in which said metal bonding plastic material comprises from about 60 to about 80 percent of a polymeric material and a balance of about 20 to about 40 percent of conductive carbon black, said polymeric material being selected from the group consisting of
    (a) an ionomeric copolymer containing about 25 to about 98.5 percent ethylenic units and between about 1.5 to about 30 percent carboxylic acid units, at least the major portion of which is in the free acid form, and
    (b) a blend of said ionomeric copolymer and a compatible thermoplastic elastomer, said ionomeric copolymer being present in an amount effective to promote bonding between said metal and said metal bonding plastic material, said process comprising cleaning the metal, heating the metal, and flowing said metal bonding material onto the cleaned, heated surface of such metal.

15. The process of claim 14, in which the metal is cleaned by washing with detergent followed by a rinse with pure or de-ionized water and dried just before the bonding.

16. The process of claim 15, in which said metal and plastic material are maintained at compatible temperatures during the bonding.

17. The process of claim 16, in which the metal and the plastic material are maintained at a temperature between about 400 and about 430 degrees F.

18. The process of claim 16, in which the metal is passed through a crosshead die of an extruder designed to apply a coating of the plastic material thereon and in which said plastic material is concomitantly extruded at a rate to give a continuously smooth coating on said metal.

* * * * *

UNITED STATES PATENT AND TRADEMARK OFFICE
CERTIFICATE OF CORRECTION

PATENT NO. : 4,463,054
DATED : July 31, 1984
INVENTOR(S) : Wayne F. Nelson

It is certified that error appears in the above—identified patent and that said Letters Patent is hereby corrected as shown below:

Title page, [56] References Cited, U.S. PATENT DOCUMENTS; insert as the first line, -- 3,562,124  2/1971 Leon . . . . 428/328 -- Notice of References Cited, dated May 5, 1984, attachment to Paper 12

Col. 4, line 54; "thereafer" should read -- thereafter --

Col. 4, line 58; "non-forming" should read -- non-foaming --

Col. 5, line 54; "claim 4," should read -- claim 5, --

Col. 6, line 1; "claim 6" should read -- claim 6, --

Signed and Sealed this

Twenty-fifth Day of June 1985

[SEAL]

Attest:

DONALD J. QUIGG

Attesting Officer

Acting Commissioner of Patents and Trademarks